FIG. 1.

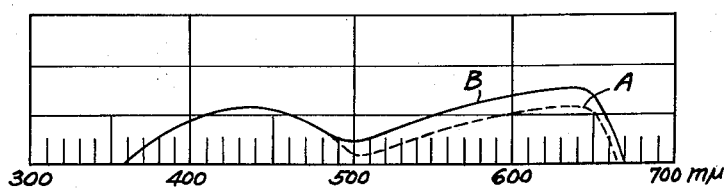

A = Anhydro-5,5'-dichloro-9-ethyl-3,3'-di-β-sulfoethylthia-carbocyanine hydroxide B = Anhydro-5,5'-dichloro-9-ethyl-3,3'-di-β-sulfoethylthia-carbocyanine hydroxide plus 2-(p-diethylaminostyryl)benzothiazole

FIG. 2.

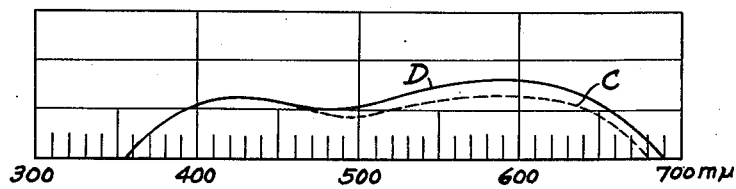

C = 3-β-Carboxyethyl-1'-ethylthia-2'-carbocyanine iodide

D = 3-β-Carboxyethyl-1'-ethylthia-2'-carbocyanine iodide plus 2-(p-diethylaminostyryl) benzothiazole

FIG. 3.

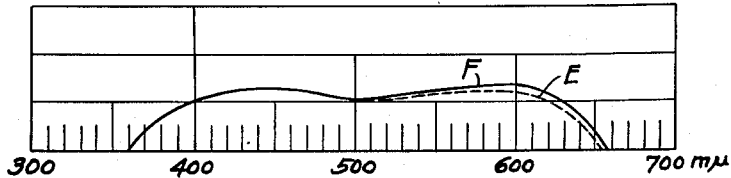

E = Anhydro-3,3'-di-β-carboxyethylthiacarbocyanine hydroxide

F = Anhydro-3,3'-di-β-carboxyethylthiacarbocyanine hydroxide plus 2-(p-diethylaminostyryl) benzothiazole

BURT H. CARROLL
JOHN SPENCE
INVENTORS

Patented Dec. 12, 1950

2,533,426

UNITED STATES PATENT OFFICE 2,533,426

PHOTOGRAPHIC EMULSIONS SENSITIZED WITH SUPERSENSITIZING COMBINATIONS OF ACID CARBOCYANINE DYES AND STYRYL BASES

Burt H. Carroll and John Spence, Rochester, N. Y., assignors to Eastman Kodak Company, Rochester, N. Y., a corporation of New Jersey Application October 13, 1948, Serial No. 54,332

15 Claims. (Cl. 95—7)

This invention relates to photographic emulsions sensitized with a supersensitizing combination of acid carbocyanine dyes and styryl bases, and to a process for preparing the same.

It is known that styryl bases supersensitize basic monomethine cyanine dyes and, to a lesser extent, basic carbocyanine dyes and basic hemidicarbocyanine dyes. See United States Patents 2,313,922, dated March 16, 1943, and 2,316,268, dated April 16, 1943. It is also known that acid and basic sensitizing dyes are relatively incompatible; for example, sensitization by means of combinations of eosin dyes and cyanine dyes is generally weaker than the sum of the individual effects produced by eosin dyes (acid) and the cyanine dyes (basic).

We have now found that certain acid carbocyanine dyes, e. g. acid thiacarbocyanine, acid thia-2'-carbocyanine, acid 4'-carbocyanine, acid benzothiacarbocyanine and acid benzothia-2'-carbocyanine dyes, can be supersensitized with styryl bases, providing the acid dyes contain specific acid groups, i. e. carboxyethyl and/or sulfoethyl groups on at least one of the auxochromophoric nitrogen atoms. The acid dyes containing carboxymethyl groups on the auxochromophoric nitrogen atoms are not supersensitized by the styryl bases, nor are acid oxa- and selenecarbocyanine dyes.

It is, accordingly, an object of our invention to provide photographic emulsions sensitized with supersensitizing combinations of acid carbocyanine dyes and styryl bases. A further object is to provide a process for the preparation of such novel emulsions. Still other objects will become apparent hereinafter.

The acid carbocyanine dyes which we employ in practicing our invention can be represented by the following general formulas:

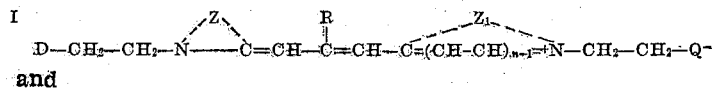

and

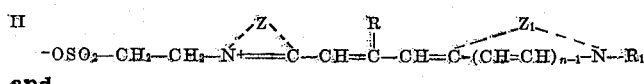

and

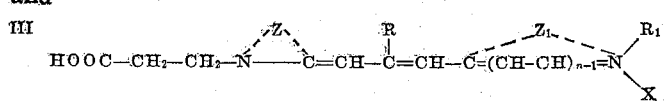

wherein D represents a member selected from the group consisting of a carboxyl group and a sulfo group, $n$ represents a positive integer of from 1 to 2, $Q^-$ represents a member selected from the group consisting of $-COO^-$ and $-SO_2O^-$, R represents a member selected from the group consisting of a hydrogen atom, a methyl group and an ethyl group, $R_1$ represents a primary alkyl group of the formula $C_dH_{2d+1}$ wherein $d$ represents a positive integer from 1 to 4, X represents an anion, Z represents the non-metallic atoms necessary to complete a heterocyclic nucleus selected from the group consisting of heterocyclic nuclei of the benzothiazole series and heterocyclic nuclei of the α-naphthothiazole series and $Z_1$ represents the non-metallic atoms necessary to complete a heterocyclic nucleus selected from the group consisting of heterocyclic nuclei of the benzothiazole series, heterocyclic nuclei of the α-naphthothiazole series, heterocyclic nuclei of the 2-quinoline series and heterocyclic nuclei of the 4-quinoline series, except that $Z_1$ does not represent the non-metallic atoms necessary to complete a heterocyclic nucleus of the 4-quinoline series when Z represents the non-metallic atoms necessary to complete a heterocyclic nucleus of the α-naphthothiazole series. More specifically Z represents the non-metallic atoms necessary to complete a heterocyclic nucleus, such as benzothiazole, 4-methylbenzothiazole, 5-methylbenzothiazole, 6-methylbenzothiazole, 4-chlorobenzothiazole, 5-chlorobenzothiazole, 6-chlorobenzothiazole, 7-chlorobenzothiazole, 5-bromobenzothiazole, 6-bromobenzothiazole, 5-iodobenzothiazole, 6-iodobenzothiazole, 4-phenylbenzothiazole, 5-phenylbenzothiazole, 4-methoxybenzothiazole, 5-methoxybenzothiazole, 6-methoxybenzothiazole, 5,6-dimethoxybenzothiazole, 5-ethoxybenzothiazole, 5,6-dioxymethylenebenzothiazole, α-naphthothiazole, 8-methoxy-α-naphthothiazole, 7-methoxy-α-naphthothiazole, etc. More specifically $Z_1$ represents the non-metallic atoms necessary to complete a benzothiazole or an α-naphthothiazole nucleus such as those set forth above under Z or a 2-quinoline nucleus, e. g. 2-quinoline, 6-methoxy-2-quinoline, 6-ethoxy-2-quinoline, 6-methyl-2-quinoline, 7- methyl-2-quinoline, 8-methyl-2-quinoline, 6-chloro-2-quinoline, 8 - chloro - 2 - quinoline, 4-chloro-2-quinoline, 7-ethoxy-2-quinoline, etc., or a 4-quinoline nucleus, e. g. 4-quinoline, 6-methoxy-4-quinoline, 7-methyl-4-quinoline, etc. The ammonium or metal salt forms of these acid carbocyanine dyes can also be used.

Typical of the dyes represented by Formula I above are:

(a) Anhydro - 5,5'-dichloro - 9 - ethyl-3,3'-di-β-sulfoethylthiacarbocyanine hydroxide having the formula:

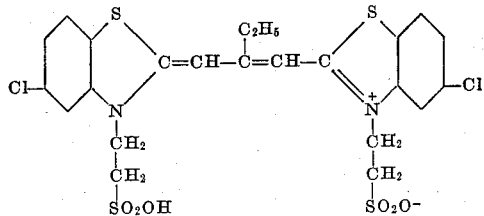

(b) Anhydro - 5,5' - dichloro-9-methyl - 3,3'-di-β-sulfoethylthiacarbocyanine hydroxide.
(c) Anhydro-3 - β - carboxyethyl - 5,5'-dichloro-9-methyl-3' - β - sulfoethylthiacarbocyanine hydroxide.
(d) Anhydro - 3,3'-di-β-carboxyethylthiacarbocyanine hydroxide having the formula:

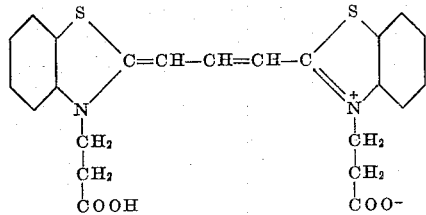

(e) Anhydro-3,3'-di - β-carboxyethyl-9-methylthiacarbocyanine hydroxide.
(f) Anhydro-3,3' - di - β - carboxyethyl-9-ethylthiacarbocyanine hydroxide.
(g) Anhydro - 3,3' - di - β-carboxyethyl-5,5'-dichloro-9-methylthiacarbocyanine hydroxide.
(h) Anhydro-3,3'-di-β-carboxyethyl - 9 - ethyl-5,5'-diphenylthiacarbocyanine hydroxide.
(i) Anhydro - 3,3'-di-β-carboxyethyl-9-methyl-6,7,6',7'-dibenzothiacarbocyanine hydroxide.

Typical of the dyes represented by Formula II above are:

(j) Anhydro-5-chloro-1'-ethyl - 3 - β-sulfoethylthia-2'-carbocyanine hydroxide having the formula:

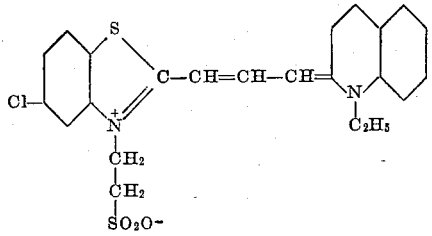

(k) Anhydro-3-β - carboxyethyl - 1' - ethyl-6,7-benzothia-2'-carbocyanine hydroxide.[1]
(l) Anhydro - 3 - β - carboxyethyl-5-chloro-1'-ethylthia-2'-carbocyanine hydroxide.[1]
(m) Anhydro-3-β-carboxyethyl - 5 - chloro - 1'-ethylthia-4'-carbocyanine hydroxide.[1]
(n) Anhydro - 3 - β-carboxyethyl - 1'-ethylthia-4'-carbocyanine hydroxide.[1]

[1] These dyes are ordinarily obtained as their semi hydroiodides.

Typical of the dyes represented by Formula III above are:

(o) 3-β-carboxyethyl - 3',9 - diethyl-5,5'-dichlorothiacarbocyanine iodide having the formula:

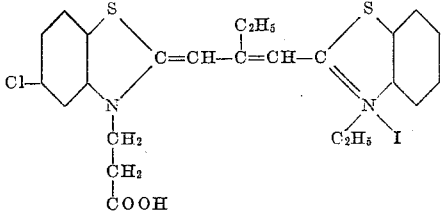

(p) 3 - β - carboxyethyl-1'-ethylthia-2' - carbocyanine iodide.
(q) 3-β-carboxyethyl - 1' - ethyl-9-methylthia-2'-carbocyanine iodide.
(r) 3 - β - carboxyethyl - 5 - chloro-1',9-diethylthia-2'-carbocyanine iodide.

The styryl bases which we employ are heterocyclic nitrogen bases containing a dialkylaminostyryl group in a reactive position, i. e. in the α- or γ-position. These bases can be represented by the following general formula:

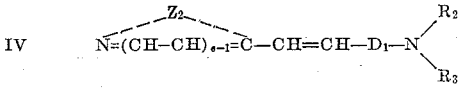

wherein $e$ represents a positive integer of from 1 to 2, $D_1$ represents a p-arylene group of the benzene series, e. g. phenylene, methoxy-p-phenylene, etc., $R_2$ and $R_3$ each represents an alkyl group which can be the same or different, e. g. methyl, ethyl, n-propyl, n-butyl, isobutyl, β-hydroxyethyl, β-methoxyethyl, etc., and $Z_2$ represents the non-metallic atoms necessary to complete a heterocyclic nucleus containing from 5 to 6 atoms in the heterocyclic ring, e. g. a heterocyclic nucleus of the thiazole series (e. g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a heterocyclic nucleus of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5,6-dioxymethylenebenzothiazole, 5-hydroxybenzothiazole, 6-hydroxybenzothiazole, etc.), a heterocyclic nucleus of the naphthothiazole series (e. g. α-naphthothiazole, β-naphthothiazole, 7-methoxy-α-naphthothiazole, 8-methoxy-α-naphthothiazole, 5-methoxy-β-naphthothiazole, 5-ethoxy-β-naphthothiazole, etc.), a heterocyclic nucleus of the selenazole series (e. g. 4-methylselenazole, 4-phenylselenazole, etc.), a heterocyclic nucleus of the benzoselenazole series (e. g. benzoselenazole, 5-chlorobenzoselenazole, 6-methoxybenzoselenazole, 5-methoxybenzoselenazole, etc.), a heterocyclic nucleus of the naphthoselenazole series (e. g. α-naphthoselenazole, β-naphthoselenazole, cet.), a heterocyclic nucleus of the oxazole series (e. g. 4-methyloxazole, 4-phenyloxazole, 5-methyloxazole, 4,5-diphenyloxazole, 4-ethyloxazole, 5-phenyloxazole, 4,5-dimethyloxazole, etc.), a heterocyclic nucleus of the benzoxazole series (e. g. benzoxazole, 5-hydroxybenzoxazole, 6-hydroxybenzoxazole, 5-chlorobenzoxazole, 5-methoxybenzoxazole, 6-methoxybenzoxazole, 5-bromobenzoxazole, etc.), a heterocyclic nucleus of the naphthoxazole series (e. g. α-naphthoxazole, β-naphthoxazole, etc.), a heterocyclic nucleus of the 2-quinoline series (e. g. 2-quinoline, 6-methyl-2-quinoline, 7-methyl-2-quinoline, 8-methyl-2-quinoline, 6-chloro-2-quinoline, 8-chloro-2-quinoline, 4-chloro-2-quinoline, 5-ethoxy-2-quinoline, 6-ethoxy-2-quinoline, 7-ethoxy-2-quinoline, 6-hydroxy-2-quinoline, 7-hydroxy-2-quinoline, 6-methoxy-2-quinoline, etc.), a heterocyclic nucleus of the 4-quinoline series (e. g. 4-quinoline, 6-methoxy-4-quinoline, 7-methyl-4-quinoline, 8-methyl-4-quinoline, etc.), a heterocyclic nucleus of the 2-pyridine series (e. g. 2-pyridine, 5-chloro-2-pyridine, etc.), a heterocyclic nucleus of the 4-pyridine series (e. g. 4-pyridine, 5-chloro-4-pyridine, etc.), a heterocyclic nucleus of the isoquinoline series (e. g. isoquinoline, etc.), etc.

Typical of the styryl bases represented by Formula IV above are:

(1) 2-p-diethylaminostyrylbenzothiazole

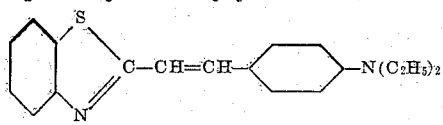

(2) 2-p-diethylaminostyryl-β-naphthothiazole.
(3) 2-p-diethylaminostyrylpyridine.
(4) 2-p-diethylaminostyrylbenzoselenazole.
(5) 2-p-diethylaminostyrylquinoline

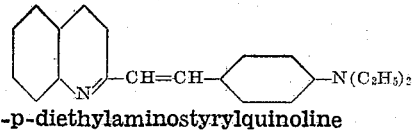

(6) 4-p-diethylaminostyrylquinoline

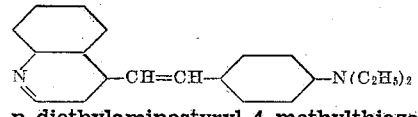

(7) 2-p-diethylaminostyryl-4-methylthiazole

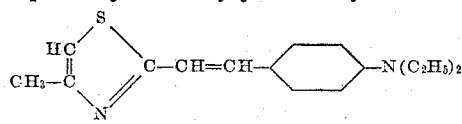

(8) 4-p-dimethylaminostyrylpyridine.

According to our invention, we incorporate one or more sensitizing acid carbocyanine dyes of the kind defined above and one or more of the aforedefined styryl bases in a photographic silver halide emulsion. Our invention is particularly directed to the customarily employed gelatino-silver-halide emulsions. However our supersensitizing combinations can be employed in emulsions in which the carrier is other than gelatin, for example, a resinous substance or cellulose derivative which has substantially no deleterious effect on the light-sensitive silver halide. Our invention is directed primarily to the ordinarily employed gelatino-silver-halide developing-out emulsions, e. g. gelatino-silver-chloride, -chlorobromide, -chlorobromoiodide, -iodochloride, -bromide and -bromoiodide developing-out emulsions. These ordinarily employed silver halide developing-out emulsions are emulsions which form "surface" latent image (see British Patent 581,772, accepted October 24, 1946). However, silver halide emulsions which form latent image mostly inside the silver halide grains (see British Patent 581,772, supra) can also be employed.

The acid carbocyanine dyes and the styryl bases can be employed in various concentrations depending upon the effects desired. In preparing our supersensitized emulsions, we have found that for the ordinary gelatino-silver-halide emulsions the concentration of the individual acid carbocyanine dyes is advantageously within the range, 0.03 to 0.2 g. per mole of silver halide in the emulsion, and that the concentration of the styryl base is advantageously within the range, 0.003 to 0.05 g. per mole of silver halide in the emulsion.

It is, of course, well known in the art that the sensitivity conferred upon an emulsion by a sensitizing dye (or dyes) does not increase proportionately to the concentration of the dye (or dyes) in the emulsion, but passes through a maximum as the concentration is increased. Likewise, the sensitivity conferred on emulsions by our new supersensitizing combinations passes through a maximum as the concentration is increased. In determining the optimum concentration for any of our new supersensitizing combinations it is advisable to begin with a supersensitizing combination in which the sensitizing dye is at somewhat less than its optimum concentration, since the optimum concentration of the sensitizing dye alone does not necessarily correspond to its optimum concentration in the supersensitizing combination.

The optimum concentration of a sensitizing dye (i. e. the concentration at which the greatest sensitivity is conferred on the emulsion) can be readily determined in a manner well known to those skilled in the art by measuring the sensitivity of a series of emulsion coatings (of the same emulsion) containing different concentrations of the sensitizing dye. The optimum concentration of any of our new supersensitizing combinations can, of course, be determined similarly, by measuring the sensitivity of a series of emulsion coatings containing different concentrations of the sensitizing dye in combination with a styryl base.

The acid carbocyanine dyes are advantageously added to the emulsions by first forming a water-soluble salt of the acid carbocyanine dye and dissolving the water-soluble salt in water, methanol or ethanol, or a mixture of water, and methanol or ethanol, and dispersing the resulting solution in the emulsion. The salts are advantageously formed by adding the acid carbocyanine dye wet with a little water, methanol, or ethanol to an alkali metal hydroxide, e. g. sodium or potassium hydroxide, or ammonium hydroxide, or an amine, e. g. methylamine, ethylamine, dimethylamine, diethylamine, trimethylamine, triethylamine, ethanolamine, diethanolamine, triethanolamine, pyridine, N'-methylpiperidine, n-propylamine, isopropylamine, n-butylamine, β-ethoxyethylamine, etc. and taking up the salt which forms in a suitable solvent, e. g. water, methanol, ethanol or a mixture of water and methanol, a mixture of water and ethanol, etc. The acid carbocyanine dyes can also be added to the emulsions in the free acid forms in solution in an appropriate solvent, e. g. methanol.

The styryl bases can be added to the emulsions from their solutions in appropriate solvents, e. g. methanol. The styryl bases and the acid carbocyanine can be added to the emulsion separately or simultaneously. Both should be uniformly distributed throughout the emulsion.

The amount of acid carbocyanine dye and styryl base actually incorporated in the emulsion will, of course, vary from dye to dye and styryl base to styryl base, according to the emulsion employed and according to the effect desired. The regulation and adoption of the most economical and useful proportions will be apparent to those skilled in the art upon making the ordinary observations and tests customarily employed in the art. Our invention is directed to any emulsion containing a combination of the acid carbocyanine dyes and styryl bases whereby a supersensitizing effect is obtained. The supersensitized emulsions can be coated on a suitable support, e. g. glass, cellulose ester film, polyvinyl acetal resin film, paper, etc., to a suitable thickness and dried. The details of such coating methods are well known to those skilled in the art.

The following examples will serve to illustrate further the manner of practicing our invention. To different portions of the same batch of photographic gelatino-silver-bromoiodide emulsion were added (1) a styryl base, (2) an acid carbocyanine dye and (3) a combination of the basic dye and the acid carbocyanine dye. The different portions of emulsion were then coated on glass supports and exposed in the usual manner in a spectrograph and in a sensitometer to white light and through filters, including a Wratten No. 25 (red) filter and a Wratten No. 12 (minus blue) filter. Following are several examples of such emulsions together with the speed (clear or white light, red and minus blue), the gamma and the fog obtained. The speed number given in these examples is $10/i$ where $i$ is the inertia in meter candle seconds of sunlight quality.

The accompanying drawing illustrates the supersensitizing effect obtained with three of our new combinations in gelatino-silver-bromoiodide emulsions. Each figure of the drawing is a diagrammatic reproduction of two spectrograms. In each figure, the sensitivity of the emulsion containing only the acid sensitizing dye is represented by the broken-line curve, while the sensitivity of the same emulsion containing the sensitizing dye in combination with a styryl base is represented by the solid line curve. Inasmuch as the styryl bases have little or no sensitizing effect on gelatino-silver-bromoiodide emulsions, no spectrogram for the emulsion containing the styryl base is shown.

In Fig. 1, curve A represents the sensitivity of a gelatino-silver-bromoiodide emulsion containing anhydro-5,5'-dichloro-9-ethyl-3,3'-di-$\beta$-sulfoethylthiacarbocyanine hydroxide (in a concentration of 85 mg. per mole of silver halide) and curve B represents the sensitivity of the same gelatino-silver-bromoiodide emulsion containing anhydro - 5,5'- dichloro - 9 - ethyl - 3,3' - di - $\beta$- sulfoethylthiacarbocyanine hydroxide (in a concentration of 85 mg. per mole of silver halide) plus 2-(p-diethylaminostyryl)benzothiazole in a concentration of 8.5 mg. per mole of silver halide.

In Fig. 2, curve C represents the sensitivity of a gelatino-silver-bromoiodide emulsion containing 3 - $\beta$ - carboxyethyl - 1'- ethylthia - 2'- carbocyanine iodide (in a concentration of 85 mg. per mole of silver halide) and curve D represents the sensitivity of the same gelatino-silver-bromoiodide emulsion containing 3-$\beta$-carboxyethyl-1'-

*Table I*

| Dye | Clear | | Wratten No. 25 (red) filter | | Wratten No. 12 (minus blue) filter | | |
|---|---|---|---|---|---|---|---|
| | Speed [1] | Gamma | Speed | Gamma | Speed | Gamma | Fog |
| Anhydro-5,5'-dichloro-9-ethyl-3,3'-di-$\beta$-sulfoethylthiacarbocyanine hydroxide (I), .085 g./mol. silver halide | 410 | 3.10 | 66 | 2.96 | 100 | 3.24 | .05 |
| I, .085 g./mol.+2-(p-diethylaminostyryl) benzothiazole (II), .0085 g./mol. silver halide | 610 | 3.16 | 138 | 2.84 | 265 | 2.80 | .08 |
| I, .085 g./mol.+2-(p-diethylaminostyryl)-$\beta$-naphthothiazole .0085 g./mol. silver halide | 550 | 2.94 | 118 | 3.48 | 210 | 3.20 | .06 |
| I, .085 g./mol.+2-(p-diethylaminostyryl)pyridine .0085 g./mol. silver halide | 490 | 3.54 | 105 | 3.14 | 175 | 3.40 | .07 |
| I, .085 g./mol.+2-(p-diethylaminostyryl)benzothiazole ethiodide, .0085 g./mol. silver halide [2] | 420 | 3.30 | 56 | 3.40 | 120 | 3.18 | .06 |
| 2(p-diethylaminostyryl)benzothiazole ethiodide, .0085 g./mol. silver halide [2] | 360 | 3.36 | 5.9 | 0.68 | 16 | 2.96 | .05 |

*Table II*

| Dyes | Clear | | Wratten No. 12 (minus blue) filter | | |
|---|---|---|---|---|---|
| | Speed [1] | Gamma | Speed | Gamma | Fog |
| Anhydro-3, 3'-di-$\beta$-carboxyethylthiacarbocyanine hydroxide (III), .085 g./mol. silver halide | 210 | 1.70 | 65 | 1.47 | .09 |
| III, .085 g./mol.+2(p-diethylaminostyryl)benzothiazole (II), .0085 g./mol. silver halide | 280 | 1.41 | 92 | 1.47 | .26 |
| Anhydro-3, 3'-di-$\beta$-carboxyethyl-9-methylthiacarbocyanine hydroxide (IV), .085 g./mol. silver halide | 255 | 1.65 | 61 | 1.40 | .11 |
| IV, .085 g./mol.+2(p-diethylaminostyryl)benzothiazole (II), .0085 g./mol. silver halide | 295 | 1.44 | 102 | 1.60 | .21 |
| Anhydro-3, 3'-di-$\beta$-carboxyethyl-5, 5'-dichloro-9-methylthiacarbocyanine hydroxide (V), .085 g./mol. silver halide | 130 | 1.49 | 112 | 1.04 | .07 |
| V, .085 g./mol.+2(p-diethylaminostyryl)benzothiazole (II), .0085 g./mol. silver halide | 138 | 1.60 | 271 | 1.48 | .10 |
| Anhydro-3-$\beta$-carboxyethyl-5, 5'-dichloro-9-methyl-3'-$\beta$-sulfoethylthia-carbocyanine hydroxide (VI), .085 g./mol. silver halide | 410 | 2.70 | 148 | 2.62 | .04 |
| VI, .085 g./mol.+2(p-diethylaminostyryl)benzothiazole (II), .0085 g./mol. silver halide | 610 | 2.72 | 230 | 2.94 | .05 |
| Anhydro-5-chloro-1'-ethyl-3-$\beta$-sulfoethylthia-2'-carbocyanine hydroxide, (VII), .085 g./mol. silver halide | 380 | 2.76 | 39 | 3.56 | .04 |
| VII, .085 g./mol.+2(p-diethylaminostyryl)benzothiazole (II), .0085 g./mol. silver halide | 360 | 3.10 | 55 | 3.28 | .04 |
| 3-$\beta$-Carboxyethyl-1'-ethylthia-2'-carbocyanine iodide (VIII), .085 g./mol. silver halide | 440 | 2.78 | 145 | 3.24 | .05 |
| (VIII), .085 g./mol.+2(p-diethylaminostyryl)benzothiazole (II), .0085 g./mol. silver halide | 560 | 3.10 | 265 | 3.04 | .06 |
| 3-$\beta$-Carboxyethyl-1'-ethyl-9-methylthia-2'-carbocyanine iodide (IX), .085 g./mol. silver halide | 410 | 2.50 | 165 | 2.44 | .04 |
| IX, .085 g./mol.+2(p-diethylaminostyryl) benzothiazole (II), .0085 g./mol. silver halide | 450 | 2.84 | 220 | 2.84 | .04 |
| Anhydro-3-$\beta$-carboxyethyl-5-chlorothia-2'-carbocyanine hydroxide, semi hydroiodide, (X), .085 g./mol. silver halide | 295 | 2.58 | 71 | 3.22 | .05 |
| X, .085 g./mol.+2(p-diethylaminostyryl(benzothiazole (II), .0085 g./mol. silver halide | 420 | 2.76 | 148 | 3.02 | .05 |

[1] 10/i.
[2] These data demonstrate that the effect obtained by using a styryl dye instead of the corresponding styryl base is markedly inferior to that obtained with the styryl base.

ethylthia-2'-carbocyanine iodide (in a concentration of 85 mg. per mole of silver halide) plus 2-(p-diethylaminostyryl)benzothiazole in a concentration of 8.5 mg. per mole of silver halide.

In Fig. 3, curve E represents the sensitivity of a gelatino-silver-bromoiodide emulsion containing anhydro-3,3'-di-β-carboxyethylthiacarbocyanine hydroxide (in a concentration of 85 mg. per mole of silver halide) and curve F represents the sensitivity of the same gelatino-silver-bromoiodide emulsion containing anhydro-3,3'-di-β-carboxyethylthiacarbocyanine hydroxide (in a concentration of 85 mg. per mole of silver halide) plus 2-(p-diethylaminostyryl)benzothiazole in a concentration of 8.5 mg. per mole of silver halide.

The acid carbocyanine dyes defined by Formula I, wherein D represents a carboxyl group and Q⁻ represents a —COO⁻ group, can be prepared as described in United States Patent 2,231,658, dated February 11, 1941. For example, a 2-methylbenzothiazole β-carboxyethobromide can be condensed with ethyl orthoformate, ethyl orthoacetate or ethyl orthopropionate, in pyridine, to give anhydro - 3,3' - di - β - carboxyethylthiacarbocyanine hydroxide, anhydro-3,3'-di-β-carboxyethyl-9-methylthiacarbocyanine hydroxide or anhydro-3,3'- di - β - carboxyethyl - 9 - ethylthiacarbocyanine hydroxide. 2-methyl-α-naphthothiazole β-carboxyethobromide can be similarly condensed with the aforesaid ortho esters.

The acid carbocyanine dyes defined by Formula I, wherein D represents a sulfo group and Q⁻ represents a —SO₂O⁻ group, can be prepared as described in the copending application of Robert H. Sprague, Serial No. 736,405, filed March 21, 1947, now U. S. Patent 2,503,776, dated April 11, 1950. For example, a 2-methylbenzothiazole β-sulfoethobromide can be condensed with ethyl orthoformate, ethyl orthoacetate or ethyl orthopropionate, in pyridine, to give anhydro-3,3'-di-β-sulfoethylthiacarbocyanine hydroxide, anhydro-9-methyl-3,3'-di-β-sulfoethylthiacarbocyanine hydroxide or anhydro-9-ethyl-3,3'-di-β-sulfoethylthiacarbocyanine hydroxide. 2-methyl-α-naphthothiazole β-sulfoethobromide can be similarly condensed with the aforesaid ortho esters.

The acid carbocyanine dyes defined by Formula I, wherein D represents a carboxyl group and Q represents a —SO₂O⁻ group can be prepared as described in the copending application of Robert H. Sprague, Serial No. 736,405, supra. For example, the addition product of 3-β-carboxyethyl-5-chloro-2-thioacetylmethylenebenzothiazoline and methyl-p-toluenesulfonate can be condensed with 5 - chloro - 2 - methylbenzothiazole - β - sulfoethobromide, in pyridine, to give anhydro-3-β-carboxyethyl - 5,5' - dichloro - 9 - methyl - 3' - β-sulfoethylthiacarbocyanine bromide. Anhydro-3 - β - carboxyethyl - 3' - β - sulfoethylthiacarbocyanine bromide can be prepared by condensing 2-β-acetanilidovinylbenzothiazole β-carboxyethobromide with 2-methylbenzothiazole β-sulfoethobromide, in ethyl alcohol containing triethylamine.

The acid carbocyanine dyes defined by Formula II wherein R represents a hydrogen atom, can be prepared as described by Robert H. Sprague in his copending application Serial No. 736,405, supra. For example, 2-β-acetanilidoquinoline alkiodides, 4-β-anilinoquinoline alkiodides, 2-β-acetanilidobenzothiazole alkiodides and 2-β-acetanilidovinyl-α-naphthothiazole alkiodides can be condensed, in ethyl alcohol containing triethylamine, with 2-methylbenzothiazole β-sulfoethobromide, 2-methyl-α-naphthothiazole β-sulfoethobromide and 2-methyl-β-naphthothiazole β-sulfoethobromide to give anhydro-1'-alkyl-3-β-sulfoethylthia-2'-carbocyanine hydroxides, anhydro-1'-alkyl-3-β-sulfoethylthia-2'-carbocyanine hydroxides, anhydro-3'-alkyl-3-β-sulfoethylthiacarbocyanine hydroxides, etc.

The acid carbocyanine dyes defined by Formula II wherein R represents an alkyl group, can be prepared by condensing a cyclammonium quaternary salt selected from those represented by the following general formula:

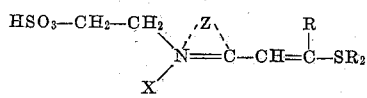

wherein R, X and Z have the values given above and R₂ represents an alkyl group, e. g. methyl, ethyl, n-propyl, isobutyl, n-butyl, etc., with a cyclammonium quaternary salt selected from those represented by the following general formula:

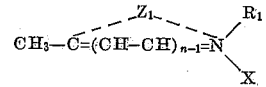

wherein $n$, R₁, X, and Z₁ have the values given above in the presence of a tertiary amine such as triethlamine, in ethyl alcohol. See the copending application of Robert H. Sprague, supra.

The acid carbocyanine dyes represented by Formula III above wherein R represents a hydrogen atom can be prepared as described in United States Patent 2,231,658, dated February 11, 1941. For example 2-methylbenzothiazole β-carboxyethiodide can be condensed with 2-β-acetanilidovinylquinoline ethiodide or 4-β-anilinovinyllepidine ethiodide in the presence of triethylamine, in ethyl alcohol. Frequently these dyes are obtained as hemi hydroiodides which can be represented as illustrated below for anhydro-3-β - carboxyethyl-1'-ethyl-6,7-benzothia-2'-carbocyanine hydroxide, viz.

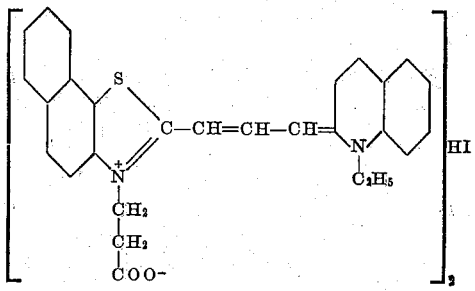

The acid carbocyanine dyes which are represented by Formula III wherein R represents alkyl can be prepared by condensing the addition product of a 3-β-carboxyethyl-2-thioacylmethylenebenzothiazoline with an alkyl salt or the addition product of a 3-carboxyethyl-2-thioacylmethylene-α-naphthothiazoline with an alkyl salt, with a quinaldine, a lepidine, a 2-methylbenzothiazole or a 2-methyl-α-naphthothiazole quaternary salt, in the presence of triethylamine in ethyl alcohol. The following examples will illustrate further the preparation of the dyes:

*Example A.—3 - β - carboxyethyl - 1' - ethyl - 9 - methylthia-2'-carbocyanine iodide*

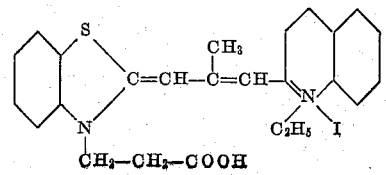

1.4 g. (1 mol.) of 3-β-carboxyethyl-2-thio-acetylmethylenebenzothiazoline and 0.93 g. (1 mol.) of methyl p-toluenesulfonate were heated together at the temperature of the steam-bath for 30 minutes. To the resulting product was added 1.5 g. (1 mol.) of quinaldine ethiodide, 25 cc. of absolute ethyl alcohol and 0.5 g. (1 mol.) of triethylamine. The reaction mixture was heated at the refluxing temperature for 15 minutes. After cooling, the mixture was treated with 5 cc. of acetic acid and the whole chilled. The dye was collected on a filter and washed first with acetone and then water. The yield of dye was 44% crude and 26% after two recrystallizations from methyl alcohol. The dull green crystals had melting point 167-169° C. with decomposition.

*Example B.—3-β-carboxyethyl-5-chloro-1',9-diethylthia-2'-carbocyanine iodide*

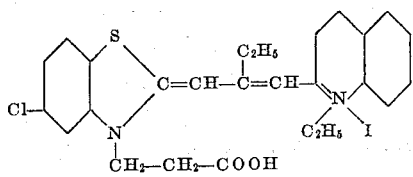

1.1 g. (1 mol.) of 3-β-carboxyethyl-5-chloro-2-thiopropionylmethylenebenzothiazoline and 0.62 g. (1 mol.) of methyl p-toluenesulfonate were heated together at the temperature of the steam-bath for 30 minutes. To the resulting product was added 1.0 g. (1 mol.) of quinaldine ethiodide, 20 cc. of absolute ethyl alcohol and 0.33 g. (1 mol.) of triethylamine. The reaction mixture was heated at the refluxing temperature for 30 minutes. After cooling, the mixture was treated with an excess of acetic acid and the whole chilled. The dye was collected on a filter and washed first with acetone and then water. The yield of dye was 30% crude and 15% after two recrystallizations from methyl alcohol. The bronze crystals had melting point 212-214° C. with decomposition.

*Example C.—3 - β - carboxyethyl - 5,5'-dichloro-3,9-diethylthiacarbocyanine iodide*

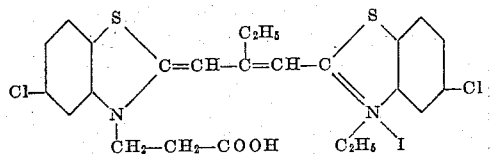

2.83 g. (1 mol.) of 5-chloro-3-ethyl-2-thiopropionylmethylenebenzothiazoline and 1.86 g. (1 mol.) of methyl p-toluenesulfonate were heated together at the temperature of the steam-bath for 30 minutes. To the resulting product was added 3.5 g. (1 mol.) of 5-chloro-2-methylbenzothiazole β-carboxyethiodide, 25 cc. of absolute ethyl alcohol and 1.0 g. (1 mol.) of triethylamine. The reaction mixture was heated at the refluxing temperature for 30 minutes. After cooling, the mixture was treated with an excess of acetic acid and the whole chilled. The dye was collected on a filter and washed first with acetone and then water. The yield of dye was 35% crude and 19% after two recrystallizations from methyl alcohol. The dark green crystals had melting point 254-255° C., with decomposition.

The 3 - β-carboxyethyl-2-thioacetylmethylenebenzothiazoline and 3-β-carboxyethyl-5-chloro-2 - thiopropionylmethylenebenzothiazoline employed in the foregoing Examples A and B can be prepared by condensing 2-methylbenzothiazole-β-carboxyethyl ethiodide with methyldithioacetate or by condensing 5-chloro-2-methylbenzothiazole β-carboxyethiodide with methyl dithiopropionate, in the presence of triethylamine in pyridine as described in the copending application of Robert H. Sprague, Serial No. 730,564, filed February 24, 1947, now U. S. Patent 2,481,698, dated September 13, 1948. 5-chloro-3-ethyl-2-thiopropionylmethylenebenzothiazoline is described in United States Patent 2,369,646, dated February 20, 1945.

Anhydro - 3,3'-di - β - carboxyethyl - 9 - ethyl-5,5'-diphenylthiacarbocyanine hydroxide can be prepared by condensing 2-methyl-5-phenylbenzothiazole β-carboxyethiodide with ethyl orthopropionate in pyridine, in the manner described by Gertrude Van Zandt and Leslie G. S. Brooker in their copending application Serial No. 711,816, filed November 22, 1946, now U. S. Patent 2,515,913, dated July 18, 1950.

The benzothiazole, α-naphthothiazole and quinoline nuclei involved in the acid carbocyanine dyes employed in practicing our invention can carry substituents, such as methyl, ethyl, methoxyl, ethoxyl, phenyl, hydroxyl groups and chlorine, bromine or iodine atoms, for example. Similarly the benzothiazole, naphthothiazole, benzoxazole, naphthoxazole, benzoselenazole naphthoselenazole, quinoline, pyridine, simple thiazole, simple oxazole, simple selenazole, etc. nuclei involved in the styryl bases can carry substituents, e. g. those set forth above in connection with the acid dyes.

Hydroxycyclammonium quaternary salts and cyanine dyes made therefrom are described by E. Van Lare and L. G. S. Brooker in their copending application Serial No. 18,846, filed April 3, 1948.

What we claim as our invention and desire to be secured by Letters Patent of the United States is:

1. A photographic silver halide emulsion sensitized with a supersensitizing combination of at least one sensitizing acid carbocyanine dye selected from the group consisting of those represented by the following three general formulas:

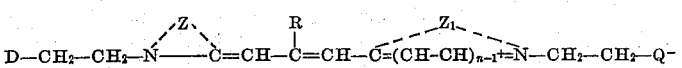

and

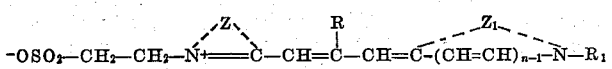

and

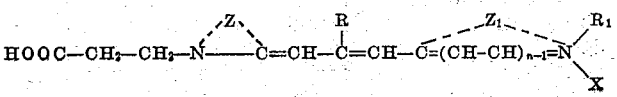

wherein D represents a member selected from the group consisting of a carboxyl group and a sulfo group, $n$ represents a positive integer of from 1 to 2, $Q^-$ represents a member selected from the group consisting of $-COO^-$ and $-SO_2O^-$, R represents a member selected from the group consisting of a hydrogen atom, a methyl group and an ethyl group, $R_1$ represents a primary alkyl group of the formula $C_dH_{2d+1}$ wherein $d$ represents a positive integer of from 1 to 4, X represents an anion, Z represents the non-metallic atoms necessary to complete a heterocyclic nucleus selected from the group consisting of heterocyclic nuclei of the benzothiazole series and heterocyclic nuclei of the α-naphthothiazole series, and $Z_1$ represents the non-metallic atoms necessary to complete a heterocyclic nucleus selected from the group consisting of heterocyclic nuclei of the benzothiazole series, heterocyclic nuclei of the α-naphthothiazole series, heterocyclic nuclei of the 2-quinoline series and heterocyclic nuclei of the 4-quinoline series, except that $Z_1$ does not represent the non-metallic atoms necessary to complete a heterocyclic nucleus of the 4-quinoline series when Z represents the non-metallic atoms necessary to complete a heterocyclic nucleus of the α-naphthothiazole series, together with at least one styryl base.

2. A photographic emulsion as defined in claim 1 wherein the photographic emulsion is a gelatino-silver-halide developing-out emulsion.

3. A photographic emulsion as defined in claim 1, wherein the photographic emulsion is a gelatino-silver-halide developing-out emulsion and the styryl base is selected from the group of styryl bases represented by the following general formula:

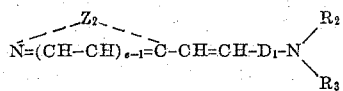

wherein $e$ represents a positive integer of from 1 to 2, $D_1$ represents a p-arylene group of the benzene series, $R_2$ and $R_3$ each represents a primary alkyl group of the formula $C_dH_{2d+1}$ wherein $d$ represents a positive integer of from 1 to 4, and $Z_2$ represents the non-metallic atoms necessary to complete a heterocyclic nucleus selected from the group consisting of heterocyclic nuclei of the thiazole series, heterocyclic nuclei of the benzothiazole series, heterocyclic nuclei of the naphthothiazole series, heterocyclic nuclei of the selenazole series, heterocyclic nuclei of the benzoselenazole series, heterocyclic nuclei of the naphthoselenazole series, heterocyclic nuclei of the oxazole series, heterocyclic nuclei of the benzoxazole series, heterocyclic nuclei of the naphthoxazole series, heterocyclic nuclei of the quinoline series, heterocyclic nuclei of the pyridine series and heterocyclic nuclei of the isoquinoline series.

4. A gelatino-silver-halide emulsion sensitized with a supersensitizing combination of at least one sensitizing acid carbocyanine dye selected from the group consisting of those represented by the following general formula:

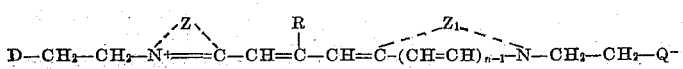

wherein D represents a member selected from the group consisting of a carboxyl group and a sulfo group, $n$ represents a positive integer of from 1 to 2, $Q^-$ represents a member selected from the group consisting of $-COO^-$ and $-SO_2O^-$, R represents a member selected from the group consisting of a hydrogen atom, a methyl group and an ethyl group, Z represents the non-metallic atoms necessary to complete a heterocyclic nucleus selected from the group consisting of heterocyclic nuclei of the benzothiazole series and heterocyclic nuclei of the α-naphthothiazole series, and $Z_1$ represents the non-metallic atoms necessary to complete a heterocyclic nucleus selected from the group consisting of heterocyclic nuclei of the benzothiazole series, heterocyclic nuclei of the α-naphthothiazole series, heterocyclic nuclei of the 2-quinoline series and heterocyclic nuclei of the 4-quinoline series, except that $Z_1$ does not represent the non-metallic atoms necessary to complete a heterocyclic nucleus of the 4-quinoline series when Z represents the non-metallic atoms necessary to complete a heterocyclic nucleus of the α-naphthothiazole series, together with a styryl base.

5. A photographic emulsion as defined in claim 4, wherein the styryl base is selected from the group of styryl bases represented by the following general formula:

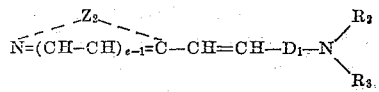

wherein $e$ represents a positive integer of from 1 to 2, $D_1$ represents a p-arylene group of the benzene series, $R_2$ and $R_3$ each represents a primary alkyl group of the formula $C_dH_{2d+1}$ wherein $d$ represents a positive integer of from 1 to 4, and $Z_2$ represents the non-metallic atoms necessary to complete a heterocyclic nucleus selected from the group consisting of heterocyclic nuclei of the thiazole series, heterocyclic nuclei of the benzothiazole series, heterocyclic nuclei of the naphthothiazole series, heterocyclic nuclei of the selenazole series, heterocyclic nuclei of the benzoselenazole series, heterocyclic nuclei of the naphthoselenazole series, heterocyclic nuclei of the oxazole series, heterocyclic nuclei of the benzoxazole series, heterocyclic nuclei of the naphthoxazole series, heterocyclic nuclei of the quinoline series, heterocyclic nuclei of the pyridine series and heterocyclic nuclei of the isoquinoline series.

6. A photographic silver halide emulsion sensitized with a supersensitizing combination of a sensitizing acid carbocyanine dye selected from the group consisting of those represented by the following general formula:

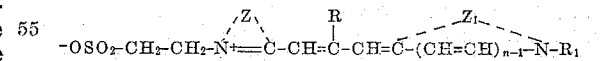

wherein $n$ represents a positive integer of from 1 to 2, R represents a member selected from the group consisting of a hydrogen atom, a methyl group and an ethyl group, $R_1$ represents a primary alkyl group of the formula $C_dH_{2d+1}$ wherein $d$ represents a positive integer of from 1 to 4, Z represents the non-metallic atoms necessary to complete a heterocyclic nucleus selected from the group consisting of heterocyclic nuclei of the benzothiazole series and heterocyclic nuclei of the α-naphthothiazole series, and $Z_1$ represents the non-metallic atoms necessary to complete a heterocyclic nucleus selected from the group consisting of heterocyclic nuclei of the benzothiazole series, heterocyclic nuclei of the α-naphthothiazole, heterocyclic nuclei of the 2-quinoline series and heterocyclic nuclei of the 4-quinoline series, except that $Z_1$ does not represent the non-metallic atoms necessary to complete a heterocyclic nucleus of the 4-quinoline series, when Z represents the non-metallic atoms necessary to complete a heterocyclic nucleus of the α-naphthothiazole series, together with at least one styryl base.

7. A photographic emulsion as defined in claim 6, wherein the styryl base is selected from the group of styryl bases represented by the following general formula:

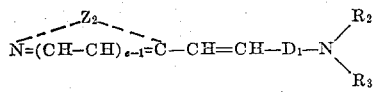

wherein $e$ represents a positive integer of from 1 to 2, $D_1$ represents a p-arylene group of the benzene series, $R_2$ and $R_3$ each represents a primary alkyl group of the formula $C_dH_{2d+1}$ wherein $d$ represents a positive integer of from 1 to 4, and $Z_2$ represents the non-metallic atoms necessary to complete a heterocyclic nucleus selected from the group consisting of heterocyclic nuclei of the thiazole series, heterocyclic nuclei of the benzothiazole series, heterocyclic nuclei of the naphthothiazole series, heterocyclic nuclei of the selenazole series, heterocyclic nuclei of the benzoselenazole series, heterocyclic nuclei of the naphthoselenazole series, heterocyclic nuclei of the oxazole series, heterocyclic nuclei of the benzoxazole series, heterocyclic nuclei of the naphthoxazole series, heterocyclic nuclei of the quinoline series, heterocyclic nuclei of the pyridine series and heterocyclic nuclei of the isoquinoline series.

8. A photographic gelatino-silver-halide developing-out emulsion sensitized with a supersensitizing combination of at least one sensitizing acid carbocyanine dye selected from the group consisting of those represented by the following general formula:

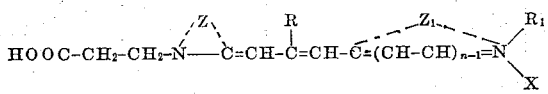

wherein $n$ represents a positive integer of from 1 to 2, R represents a member selected from the group consisting of a hydrogen atom, a methyl group and an ethyl group, $R_1$ represents a primary alkyl group of the formula $C_dH_{2d+1}$ wherein $d$ represents a positive integer of from 1 to 4, X represents an anion, Z represents the non-metallic atoms necessary to complete a heterocyclic nucleus selected from the group consisting of heterocyclic nuclei of the benzothiazole series and heterocyclic nuclei of the α-naphthothiazole series, and $Z_1$ represents the non-metallic atoms necessary to complete a heterocyclic nucleus selected from the group consisting of heterocyclic nuclei of the benzothiazole series, heterocyclic nuclei of the α-naphthothiazole series, heterocyclic nuclei of the 2-quinoline series and heterocyclic nuclei of the 4-quinoline series, except that $Z_1$ does not represent the non-metallic atoms necessary to complete a heterocyclic nucleus of the α-naphthothiazole series, together with at least one styryl base.

9. A photographic emulsion as defined in claim 8, wherein the styryl base is selected from the group of styryl bases represented by the following general formula:

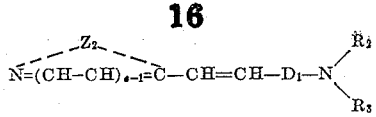

wherein $e$ represents a positive integer of from 1 to 2, $D_1$ represents a p-arylene group of the benzene series, $R_2$ and $R_3$ each represents a primary alkyl group of the formula $C_dH_{2d+1}$ wherein $d$ represents a positive integer of from 1 to 4, and $Z_2$ represents the non-metallic atoms necessary to complete a heterocyclic nucleus selected from the group consisting of heterocyclic nuclei of the thiazole series, heterocyclic nuclei of the benzothiazole series, heterocyclic nuclei of the naphthothiazole series, heterocyclic nuclei of the selenazole series, heterocyclic nuclei of the benzoselenazole series, heterocyclic nuclei of the naphthoselenazole series, heterocyclic nuclei of the oxazole series, heterocyclic nuclei of the benzoxazole series, heterocyclic nuclei of the naphthoxazole series, heterocyclic nuclei of the quinoline series, heterocyclic nuclei of the pyridine series and heterocyclic nuclei of the isoquinoline series.

10. A photographic gelatino-silver-halide developing-out emulsion sensitized with a supersensitizing combination of at least one acid carbocyanine dye selected from the group consisting of those represented by the following general formula:

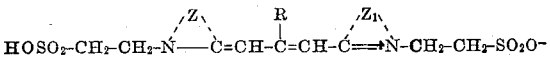

wherein R represents a member selected from the group consisting of a hydrogen atom, a methyl group and an ethyl group, and Z and $Z_1$ each represents the non-metallic atoms necessary to complete a heterocyclic nucleus of the benzothiazole series, said heterocyclic nucleus containing, in addition to the carbon atoms, the nitrogen atom and the sulfur atom in the heterocyclic ring, no atoms other than those selected from the group consisting of hydrogen atoms, carbon atoms, oxygen atoms and halogen atoms, together with at least one styryl base selected from the group consisting of those represented by the following general formula:

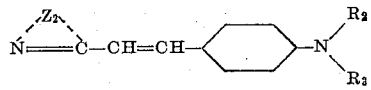

wherein $Z_2$ represents the non-metallic atoms necessary to complete a heterocyclic nucleus of the benzothiazole series, said heterocyclic nucleus containing in addition to the carbon atoms, the nitrogen atom and the sulfur atom in the heterocyclic ring no atoms other than those selected from the group consisting of hydrogen atoms, carbon atoms, oxygen atoms and halogen atoms, and $R_2$ and $R_3$ each represents a primary alkyl group of the formula $C_dH_{2d+1}$ wherein $d$ represents a positive integer of from 1 to 4.

11. A photograpic gelatino-silver-halide emulsion sensitized with a supersensitizing combination of anhydro-5,5'-dichloro-9-ethyl-3,3'-di-β-sulfoethylthiacarbocyanine hydroxide together with 2-(p-diethylaminostyryl)benzothiazole.

12. A photographic gelatino-silver-halide emulsion sensitized with a supersensitizing combination of at least one acid carbocyanine dye selected from the group consisting of those represented by the following general formula:

wherein $R_1$ represents a primary alkyl group of the formula $C_dH_{2d+1}$ wherein $d$ represents a positive integer of from 1 to 4, Z represents the non-metallic atoms necessary to complete a heterocyclic nucleus of the benzothiazole series, said heterocyclic nucleus containing in addition to the carbon atoms, the nitrogen atom and the sulfur atom in the heterocyclic ring no atoms other than hydrogen atoms, carbon atoms, oxygen atoms and halogen atoms, and $Z_1$ represents the non-metallic atoms necessary to complete a heterocyclic nucleus of the quinoline series, said heterocyclic nucleus of the quinoline series containing, in addition to the carbon atoms and the nitrogen atom in the heterocyclic ring, no atoms other than hydrogen atoms, carbon atoms, oxygen atoms and halogen atoms, together with at least one styryl base selected from the group consisting of those represented by the following general formula:

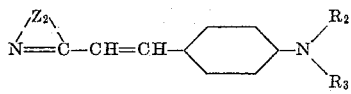

wherein $Z_2$ represents the non-metallic atoms necessary to complete a heterocyclic nucleus of the benzothiazole series, said heterocyclic nucleus containing in addition to the carbon atoms, the nitrogen atom and the sulfur atom in the heterocyclic ring no atoms other than those selected from the group consisting of hydrogen atoms, carbon atoms, oxygen atoms and halogen atoms, and $R_2$ and $R_3$ each represents a primary alkyl group of the formula $C_dH_{2d+1}$ wherein $d$ represents a positive integer of from 1 to 4.

13. A photographic gelatino-silver-halide emulsion sensitized with a supersensitizing combination of anhydro-5-chloro-1'-ethyl-3-β-sulfoethylthia-2'-carbocyanine hydroxide together with 2-(p-diethylaminostyryl)benzothiazole.

14. A photographic gelatino-silver-halide emulsion sensitized with a supersensitizing combination of at least one acid carbocyanine dye selected from the group consisting of those represented by the following general formula:

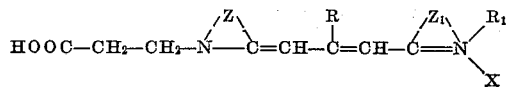

wherein R represents a member selected from the group consisting of a hydrogen atom, a methyl group and an ethyl group, $R_1$ represents a primary alkyl group of the formula $C_dH_{2d+1}$ wherein $d$ represents a positive integer of from 1 to 4, X represents an anion, Z represents the non-metallic atoms necessary to complete a heterocyclic nucleus of the benzothiazole series, said heterocyclic nucleus containing, in addition to the carbon atoms the nitrogen atom and the sulfur atom in the heterocyclic ring, no atoms other than those selected from the group consisting of hydrogen atoms, carbon atoms, oxygen atoms and halogen atoms, and $Z_1$ represents the non-metallic atoms necessary to complete a heterocyclic nucleus of the quinoline series, said heterocyclic nucleus of the quinoline series containing in addition to the carbon atoms and the nitrogen atom in the heterocyclic ring, no atoms other than hydrogen atoms, carbon atoms, oxygen atoms and halogen atoms, together with at least one styryl base selected from the group consisting of those represented by the following general formula:

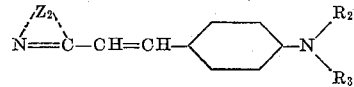

wherein $Z_2$ represents the non-metallic atoms necessary to complete a heterocyclic nucleus of the benzothiazole series, said heterocyclic nucleus containing in addition to the carbon atoms, the nitrogen atom and the sulfur atom in the heterocyclic ring no atoms other than those selected from the group consisting of hydrogen atoms, carbon atoms, oxygen atoms and halogen atoms, and $R_2$ and $R_3$ each represents a primary alkyl group of the formula $C_dH_{2d+1}$ wherein $d$ represents a positive integer of from 1 to 4.

15. A photographic gelatino-silver-halide emulsion sensitized with a supersensitizing combination of 3-β-carboxyethyl-1'-ethylthia-2'-carbocyanine iodide together with 2-(p-diethylaminostyryl)benzothiazole.

BURT H. CARROLL.
JOHN SPENCE.

No references cited.